US012737665B2

(12) United States Patent
Gao et al.

(10) Patent No.: US 12,737,665 B2
(45) Date of Patent: Sep. 15, 2026

(54) ONLINE MACHINE LEARNING-BASED MODEL FOR DECISION RECOMMENDATION

(71) Applicant: International Business Machines Corporation, Armonk, NY (US)

(72) Inventors: Bu Yu Gao, Yinchuan (CN); Prerna Agarwal, New Delhi (IN); Sampath Dechu, Bangalore (IN); Ya Bin Dang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 16/998,116

(22) Filed: Aug. 20, 2020

(65) Prior Publication Data

US 2022/0058514 A1 Feb. 24, 2022

(51) Int. Cl.
*G06N 20/00* (2019.01)
*G06N 5/04* (2023.01)

(52) U.S. Cl.
CPC .............. *G06N 20/00* (2019.01); *G06N 5/04* (2013.01)

(58) Field of Classification Search
CPC ........... G06N 20/00; G06N 5/00; G06N 5/04; G06N 5/01; G06N 3/045; G06N 3/0499
See application file for complete search history.

(56) References Cited

U.S. PATENT DOCUMENTS 5,216,592 A 6/1993 Mann et al.
5,890,133 A 3/1999 Ernst
7,565,304 B2 7/2009 Casati et al.
8,731,983 B2 5/2014 Gudla et al.
9,396,444 B2 7/2016 Bates
(Continued)

FOREIGN PATENT DOCUMENTS

WO 2017176944 A1 10/2017
WO 2019054949 A1 3/2019

OTHER PUBLICATIONS

Nicola Di Mauro, Annalisa Appice, Teresa M.A. Basile, Activity Prediction of Business Process Instances with Inception CNN Models, AI*IA 2019—Advances in Artificial Intelligence, pp. 348-361, Online: Nov. 12, 2019 (Year: 2019).*
(Continued)

*Primary Examiner* — Omar F Fernandez Rivas
*Assistant Examiner* — Corey M Sackalosky
(74) *Attorney, Agent, or Firm* — Cantor Colburn LLP; Andre L. Adkins

(57) ABSTRACT

Aspects of the invention include selecting an activity as a selected activity. A method includes designating a subset of the set of activities as classes, collecting a log of inputs and outputs of each encountered activity as a data point each time the process is implemented, and extracting features from each data point that is collected to generate a feature vector from each data point. A teacher model is initialized with a first data point and updated with each data point subsequent to the first data point. A student model is initialized with a set of data points including the first data point such that every one of the classes is encountered at least once. The student model is updated with the teacher model. A set of features is input to the student model to obtain a prediction of the outcome of the selected activity.

18 Claims, 4 Drawing Sheets

(56) References Cited

U.S. PATENT DOCUMENTS

| | | | | |
|---|---|---|---|---|
| 2016/0189058 | A1* | 6/2016 | Ozkan | G06N 5/045 706/12 |
| 2017/0076246 | A1 | 3/2017 | Volkov et al. | |
| 2019/0287515 | A1* | 9/2019 | Li | G10L 15/063 |
| 2019/0347586 | A1 | 11/2019 | Kaulgud et al. | |
| 2020/0034702 | A1* | 1/2020 | Fukuda | G06N 3/08 |
| 2020/0327392 | A1* | 10/2020 | Bleiweiss | G06N 3/08 |
| 2020/0394458 | A1* | 12/2020 | Yu | G06V 10/454 |
| 2022/0222534 | A1* | 7/2022 | Dai | G06N 3/044 |

OTHER PUBLICATIONS

Leon Kopitar, Leona Cilar, Primoz Kocbek, Gregor Stiglic, Local vs. Global Interpretability of Machine Learning Models in Type 2 Diabetes Mellitus Screening, Artificial Intelligence in Medicine: Knowledge Representation and Transparent and Explainable Systems, pp. 108-119, Online: Jan. 3, 2020 (Year: 2020).*

Lou-Jen Liu, Jian Peng, Alexander G. Schwing, Knowledge Flow: Improve Upon Your Teachers, International Conference on Learning Representations, Apr. 11, 2019 (Year: 2019).*

Bayu Adhi Tama, Marco Comuzzi, An empirical comparison of classification techniques for next event prediction using business process event logs, Expert Systems with Applications, vol. 129, pp. 233-245, Online: Apr. 12, 2019 (Year: 2019).*

Di Mauro, Nicola & Appice, Annalisa & Basile, Teresa. (2019). Activity Prediction of Business Process Instances with Inception CNN Models. 10.1007/978-3-030-35166-3_25. (Year: 2019).*

Bayu Adhi Tama, Marco Comuzzi, An empirical comparison of classification techniques for next event prediction using business process event logs, Expert Systems with Applications, vol. 129, 2019, pp. 233-245, ISSN 0957-4174, https://doi.org/10.1016/j.eswa.2019.04.016. (Year: 2019).*

Kopitar, L., Cilar, L., Kocbek, P., Stiglic, G. (2019). Local vs. Global Interpretability of Machine Learning Models in Type 2 Diabetes Mellitus Screening. In: Marcos, M., et al. Artificial Intelligence in Medicine: Knowledge Representation and Transparent and Explainable Systems. KR4HC TEAAM 2019 20 (Year: 2019).*

Kissflow "How to Fuel Operational Excellence With Process Optimization", pp. 1-3, retrieved Jul. 16, 2020, retrieved from the internet https://kissflow.com/bpm/business-process-optimization/.

Wikipedia "Business analytics", pp. 1-4, retrieved Jul. 16, 2020, retrieved from the internet https://en.wikipedia.org/wiki/Business_analytics.

* cited by examiner

300 class = block 150

| weight 310 | feature 320 |
|---|---|
| +3.208 | <BIAS> |
| +0.923 | Client Involved=FALSE |
| +0.551 | Employee SN=100002.0 |
| +0.326 | Ethical Issue=TRUE |
| +0.062 | Visa=TRUE |
| -0.056 | Visa=FALSE |
| -0.079 | Air Tickets |
| -0.177 | Travel Type=Domestic |
| -0.183 | registration charges |
| -0.188 | International Card=TRUE |
| -0.320 | Ethical Issue=FALSE |
| -0.544 | Employee SN=0 |
| -0.916 | Client Involved=TRUE |
| -4.608 | Cost |

class = block 140

| weight 310 | feature 320 |
|---|---|
| +2.719 | Client Involved=TRUE |
| +2.093 | <BIAS> |
| +1.021 | Employee SN=100002.0 |
| +0.776 | International Card=TRUE |
| +0.651 | Ethical Issue=FALSE |
| +0.600 | registration charges |
| +0.289 | Visa=FALSE |
| -0.154 | Air Tickets |
| -0.281 | Visa=TRUE |
| -0.490 | Travel Type=Domestic |
| -0.642 | Ethical Issue=TRUE |
| -1.013 | Employee SN=0 |
| -1.605 | Cost |
| -2.711 | Client Involved=FALSE |

class = block 110

| weight 310 | feature 320 |
|---|---|
| +3.153 | Cost |
| +0.889 | Client Involved=FALSE |
| +0.443 | Employee SN=100002.0 |
| +0.406 | Travel Type=Domestic |
| +0.279 | Air Tickets |
| +0.089 | International Card=TRUE |
| +0.064 | Ethical Issue=TRUE |
| +0.010 | Visa=TRUE |
| -0.012 | Visa=FALSE |
| -0.066 | Ethical Issue=FALSE |
| -0.268 | registration charges |
| -0.444 | Employee SN=0 |
| -0.891 | Client Involved=TRUE |
| -2.965 | <BIAS> |

class = block 130

| weight 310 | feature 320 |
|---|---|
| +3.060 | Cost |
| +2.002 | Employee SN=0 |
| +0.899 | Client Involved=FALSE |
| +0.260 | Travel Type=Domestic |
| +0.252 | Ethical Issue=TRUE |
| +0.209 | Visa=TRUE |
| -0.045 | Air Tickets |
| -0.149 | registration charges |
| -0.221 | Visa=FALSE |
| -0.265 | Ethical Issue=FALSE |
| -0.677 | International Card=TRUE |
| -0.912 | Client Involved=TRUE |
| -2.015 | Employee SN=100002.0 |
| -2.336 | <BIAS> |

| weight 310 | feature 320 |
|---|---|
| +12.773 | <BIAS> |
| +6.260 | Employee SN=100002.0 |
| +2.748 | Client Involved=TRUE |
| +2.468 | Ethical Issue=FALSE |
| +1.616 | International Card=TRUE |
| +1.318 | ('EVENT 1 START', 'Book Tickets and Hotel') |
| +1.318 | ('Immigration Documents Validation', 'Book Tickets and Hotel') |
| +1.318 | ('Expense Pre-approval', 'Book Tickets and Hotel') |
| +1.318 | ('Expense Estimation', 'Book Tickets and Hotel') |
| +1.318 | Book Tickets and Hotel |
| +0.713 | Visa=FALSE |
| +0.556 | Travel Type=International |
| *... 9 more positive ...* | |
| *... 3 more negative ...* | |
| -0.678 | Visa=TRUE |
| -1.581 | International Card=FALSE |
| -1.895 | Cost |
| -2.433 | Ethical Issue=TRUE |
| -2.713 | Client Involved=FALSE |
| -3.838 | Have Been To=0 |
| -3.838 | Passport=0 |
| -6.226 | Employee SN=0 |

FIG. 4

ONLINE MACHINE LEARNING-BASED MODEL FOR DECISION RECOMMENDATION

BACKGROUND

The present invention generally relates to programmable computers and, more specifically, to programmable computer systems configured and arranged to develop an online learning-based model for a decision recommendation in a process.

Machine learning is a type of artificial intelligence and generally refers to data analysis that automates analytical model building. An online learning-based model is one that is trained with data that is available in a sequential order. Thus, online machine learning may be referred to as incremental learning. By contrast, batch learning refers to a method of machine learning in which the training data set is available in batches at once. The online machine learning-based model can be used to predict the outcome of a decision activity in a process that is made up of a number of activities. The predicted outcome can be regarded as a decision recommendation.

SUMMARY

Embodiments of the present invention are directed to an online learning-based model for a decision recommendation in a process. A non-limiting example computer-implemented method includes selecting an activity among a set of activities associated with a process as a selected activity. A prediction of an outcome of the selected activity is of interest. The method includes designating a subset of the set of activities as classes, collecting a log of inputs and outputs of each encountered activity among the set of activities as a data point each time the process is implemented, and extracting features from each data point that is collected to generate a feature vector from each data point. A teacher model is initialized with a first data point that was collected and updated with each data point that was collected subsequent to the first data point. A student model is initialized with a set of data points including the first data point such that every one of the classes is encountered at least once within the set of data points. The student model is updated with the teacher model following a collection of each subsequent data point after the set of data points. A set of features is input to the student model to obtain a prediction of the outcome of the selected activity based on determining that the student model is ready for use.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a table illustrating an exemplary presentation of global interpretability of an online machine learning-based model according to one or more embodiments of the invention;

FIG. 4 is a table illustrating an exemplary presentation of local interpretability of an online machine learning-based model according to one or more embodiments of the invention.

Figure 2:
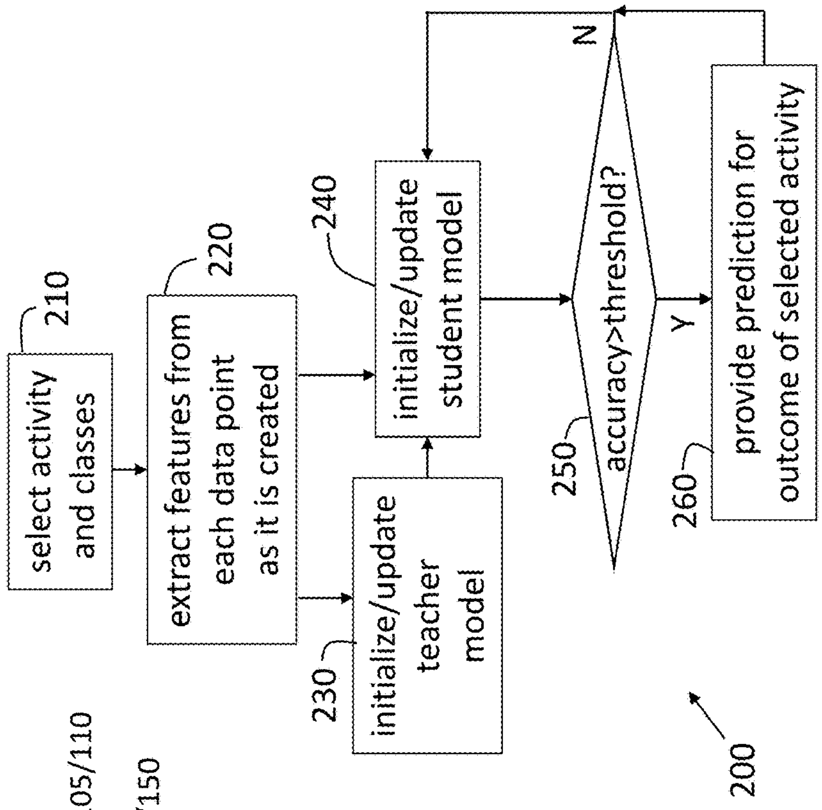
FIG. 2 is a process flow of a method of developing an online machine learning-based model for a decision recommendation in a process according to one or more embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, an online learning-based model is subject to sequential ongoing training as more training data is available. The model may predict the outcome of a decision activity in a process, such as a business process (e.g., travel reimbursement process) that includes multiple steps, some of which may otherwise involve human intervention or decision-making. The transparency of a machine learning model facilitates understanding and confidence in the model. In this regard, global interpretation of a model explains the entire model behavior while local interpretation explains an individual prediction. Thus, global interpretation provides an understanding of all the features (i.e., inputs) that drive the predictions and their relative importance (i.e., weighting). Local interpretation provides an understanding of a particular set of the features input to the model to obtain a decision recommendation.

One or more embodiments of the invention relate to the development of an online machine learning-based model for a decision recommendation in a process. More specifically, one online learning model, referred to herein as a teacher model for explanatory purposes, is used to update the parameters of another, different type of online learning model, referred to herein as a student model for explanatory purposes.

The teacher model may be selected using creme, for example. Creme is a Python library that includes tools that can be updated with a single observation or data point at a time. Exemplary teacher models include Gaussian processes and decision trees. While the performance of these types of online models can be improved with each single data point, global and local interpretability is not possible.

The student model may be selected using scikit-learn, for example. Scikit-learn is a Python library that includes tools for predictive data analysis. Exemplary student models include polynomial regression and hidden Markov models. While these types of models provide higher accuracy and facilitate global and local interpretation, they require more training data (i.e., a batch of new data points) than the teacher model in order to update parameters.

Parameters, which are weights ascribed to each of the features input to the online model, are used in both the teacher model and the student model. However, the teacher model has layers of wrapper outside the model that prevent global interpretability. The weights are extracted from the layers of the teacher model, according to embodiments of the invention, to update the weights corresponding with features of the student model. By updating weights of the student model using the per-data point update of the teacher model, the arrangement according to one or more embodiments of the invention results in the student model that can be interpreted globally and locally but can also achieve the requisite accuracy with less training data than would typically be required for such a model. The student model is used to output a prediction only after it has achieved a predefined accuracy.

Figure 1:
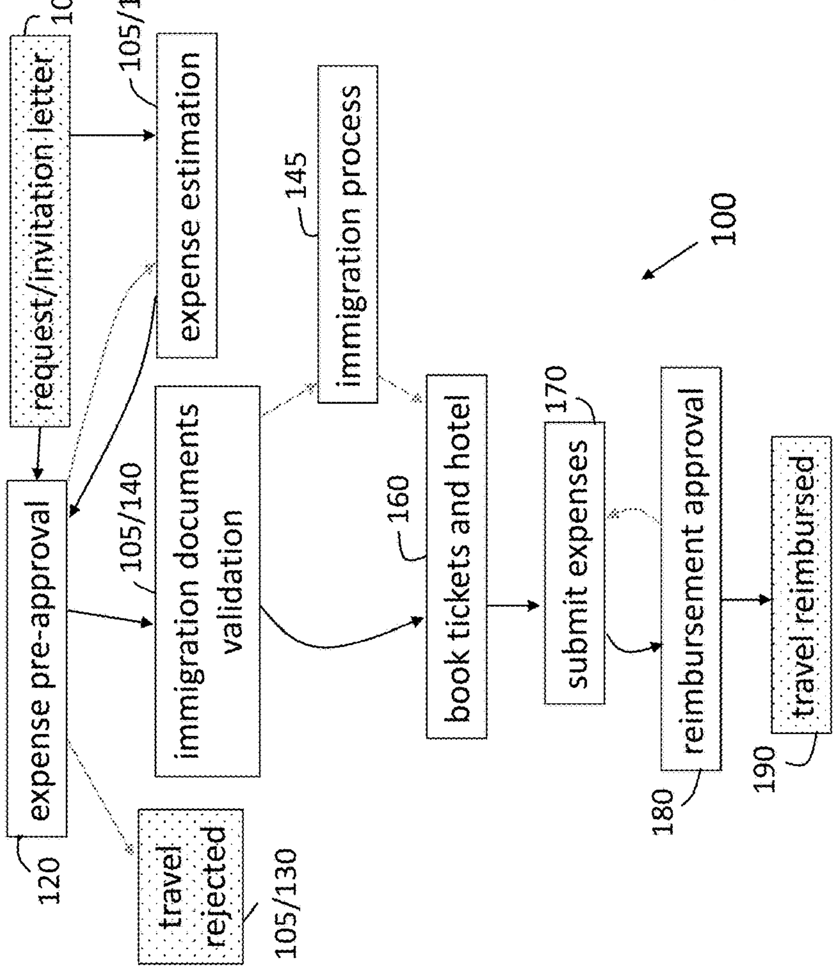
FIG. 1 shows an exemplary process to which an online machine learning-based model may be applied according to one or more embodiments of the invention.

FIG. 1 shows an exemplary travel reimbursement process 100 to which an online machine learning-based model may be applied according to one or more embodiments of the invention. Some or all aspects of the process 100 may be implemented with the processing system 500 shown in FIG. 5, for example. This non-limiting exemplary travel reimbursement process 100 is used in the discussion of FIG. 2. The designation of activities at blocks 110, 130, 140, and 150 as classes 105 will be explained in the discussion of FIG. 2. The exemplary travel reimbursement process 100 includes tasks or activities that are part of the travel reimbursement process of a business. The activity at block 110 starts the travel reimbursement process 100 and the activities at blocks 130 and 190 are potential end states. Thus, blocks 110, 130, and 190 include a pattern to distinguish those start or end activities from others.

Specifically, the starting activity at block 110 is a submission of a request (e.g., for a meeting) or invitation letter (e.g., to a conference) that involves travel expenditures. The activity at block 150 is generation of an estimate of the expense of the travel. At block 120, a pre-approval decision is made. As indicated, this pre-approval decision activity at block 120 may involve requesting and obtaining a result of the activity at block 150. This may be the case when the expense pre-approval at block 120 is sought directly from the starting activity at block 110. As a result of the activity at block 120, the travel may be rejected, at block 130, or the activity at block 140 may be performed. At block 140, the activity involves validating immigration documents required for the travel. An optional immigration process may be the activity performed at block 145 as a result of determining, at block 140, that valid immigration documents must be obtained.

At block 160, tickets (e.g., plane tickets) and hotel rooms are booked. At block 170, the expenses are submitted for approval and, at block 180, the reimbursement is approved. As indicated, the expenses submitted at block 170 may be adjusted and resubmitted for the activity at block 180. At block 190, the activity involves reimbursing the travel expenses approved at block 180. A machine learning model may be trained to predict an outcome at more than one of the activities shown for the process 100. For explanatory purposes, the subsequent discussion will detail the development of an online learning-based model for a decision recommendation (i.e., a prediction) of the activity at block 120. That is, the model will provide a recommendation for whether expense pre-approval should be successful (i.e., proceed to block 140), should require more information (at block 150), or should be rejected (at block 130).

FIG. 2 is a process flow of a method 200 of developing an online machine learning-based model for a decision recommendation in a process. The method 200 may be implemented with the processing system 500 shown in FIG. 5, for example. Continuing reference is made to the exemplary travel reimbursement process 100 shown in FIG. 1. At block 210, selecting an activity refers to selecting one of the activities of a process of interest whose outcome will be predicted (i.e., whose decision will be recommended) by an online learning-based model according to one or more embodiments of the invention. For explanatory purposes, the activity selected at block 210 from the travel reimbursement process 100 is the expense pre-approval activity at block 120. Additionally, at block 210, selecting classes 105 refers to identifying all activities that connect with the selected activity according to an exemplary embodiment of the invention. In the exemplary case, the activities at blocks 110, 130, 140, and 150, which all connect with block 120, are identified as classes 105. According to alternate embodiments of the invention, selecting classes 105 may involve selecting activities that connect with the selected activity indirectly through one or more gateways.

At block 220, the process flow includes extracting features 320 (FIG. 3) from each data point as it is created. A data point refers to a log of a pass through the process, which is the travel reimbursement process 100 in the exemplary case. Thus, part of the processing at block 220 includes collecting of a data point based on each implementation of the process. Features 320 are machine-readable versions of attribute values included in the log that makes up the data point. Attribute values and, thus, features 320 of the data point differ based on the process at issue as well as the activities encountered and logged. In the exemplary case of the travel reimbursement process 100, some exemplary features 320 include a cost value, a binary indication of whether a client is involved in the travel (e.g., true of false), and a binary indication of whether a visa is needed as part of the immigration documents. These values or indications would be inputs of the activities and are recorded as the log that makes up the data point. As further discussed, the extracted features 320 are categorized according to class 105 based on the activity that each feature 320 corresponds with. A feature 320 (e.g., cost) can be associated with multiple classes 105.

Extracting features 320, at block 220, includes identifying important or relevant features 320 among all the features 320 involved in a given activity designated as a class 105. The selection of important features 320 uses a decision-tree based method associated with the student model to be used. The feature vector (i.e., listing of extracted features 320) obtained from each data point is padded, as needed, in order to have a uniform length among all the feature vectors obtained from all the data points.

At block 230, initializing (with the first data point) or updating (with every subsequent data point) a teacher model (e.g., classifier) may involve a model selected from the creme library, for example. As previously noted, the teacher model is incrementally improved with each single data point. At block 240, initializing or updating a student model is less straight-forward than the process at block 230, as detailed. The student model may be selected using the scikit-learn library, for example.

The student model cannot be initialized with a single data point like the teacher model. Instead, enough data points are needed such that every class 105 is encountered at least once. A given data point may not involve every activity in the process and, thus, may not involve every activity designated as a class 105. For example, an exemplary data point obtained for the travel reimbursement process 100 may involve activities at blocks 110, 150, 120, and 130 but not 140. Another exemplary data point may involve activities at blocks 110, 150, 120, and 140 but not 150. Thus, it is possible to receive multiple data points in the exemplary case with none involving the activity at block 140 (i.e., one of the classes 105), for example. In this exemplary case, the student model cannot be initialized, at block 240, until at least one data point involving the activity at block 140 is received. Once initialized at block 240, the student model includes features 320 associated with each class 105 and an initial weight 310 (FIG. 3) associated with each feature 320. The weight 310 reflects the importance of the corresponding feature 320, and the weight 310 is updated based on the teacher model and every subsequent data point.

Once the student model has been initialized at block 240, the features 320 and corresponding weights 310 can be indicated as a global interpretation of the student model, as shown in FIG. 3. FIG. 3 is a table 300 illustrating an exemplary presentation of global interpretability of the student model according to one or more embodiments of the invention. The weight 310 corresponding with each feature 320 is shown specific to each of the four exemplary classes 105 (i.e., activities at blocks 110, 130, 140, and 150). As the table 300 indicates, weights may be positive or negative. In addition, the same feature 320 may be part of more than one class 105. For example, the weight 310 associated with the feature 320 of cost is −1.605 when corresponding with the class at block 140 (i.e., immigration documents validation) but the weight 310 associated with the same feature 320 is +3.060 when corresponding with the class at block 130 (i.e., travel rejected end status). This indicates the relative importance of the cost feature 320 in a rejection of the travel request (at block 130) as compared with its importance in obtaining validation of travel documents (at block 140). The global interpretation of the student model facilitates an understanding of the relevant features 320 in a prediction by the student model and, thus, an increased confidence in a result of the student model.

Returning now to FIG. 2, subsequent to initialization of the student model at block 240, updating the student model according to one or more embodiments of the invention involves advantageously using the fine grain performance improvement in the teacher model with each additional data point. Specifically, the teacher model is used in addition to new data points to update the student model. As previously noted, parameters of interest must be extracted from the teacher model because of the wrapping around the teacher model. The parameters of interest refer to weights 310 of the features 320 deemed relevant at block 220 for the student model. Thus, updating the student model refers to refining the weights 310 that are associated with the features 320 by using the per-data point update of the weights 310 in the teacher model.

For example, a prediction by the student model may be based on the equation y=ax1+bx2+cX3. In this example, x1, x2, and x3 are features 320, and a, b, and c are respective weights 310 attributed to each of the features 320. The values of a, b, and c are improved with each update to increase the accuracy of the prediction by the student model. The number of parameters (i.e., weights 310) of the teacher model are not fixed like those of the student model and may be increasing with the number of data points. Thus, only those weights 310 of the teacher model that correspond with the weights 310 of the student model, which has a fixed number of weights 310, are extracted in order to update the weights 310 of the student model with the weights 310 of the teacher model.

At block 250, a check is done, according to one or more embodiments of the invention, of whether the accuracy of the student model exceeds a predefined threshold of accuracy. This check addresses the cold start issue in machine learning whereby a prediction (i.e., decision recommendation in a process) cannot be inferred until the model has been sufficiently trained. The check of accuracy involves input features 320 for which the outcome is known and, thus, can be compared with the output of the student model. If, based on the check at block 250, the accuracy of the student model in predicting an outcome of the activity selected at block 210 (e.g., whether there will be pre-approval at block 120) does not exceed the threshold of accuracy, then updating of the student model is continued at block 240. The update of the weights 310 of the student model involves the updated corresponding weights 310 of the teacher model, as previously discussed.

If, based on the check at block 250, the accuracy of the student model is found to exceed the threshold of accuracy, then features 320 can be input to the student model to obtain a recommendation for the outcome of the selected activity. As previously noted, because the features 320 and corresponding weights 310 are available based on using the student model, global and local interpretability is possible for the student model. That is, a visual output explaining the relevant features 320 and their weights 310 can be presented along with a given decision recommendation for a given input set of features 320. Such an output, which is referred to as the local interpretation, ensures understandability and trust in the outcome of the student model that is updated using the teacher model according to one or more embodiments of the invention.

FIG. 4 is a table 400 illustrating an exemplary presentation of local interpretability of the student model according to one or more embodiments of the invention. As previously noted, the table 300 in FIG. 3 provides an exemplary visualization of global interpretation and, thus, relates to the complete student model and the classes 105 that are pertinent to the selected activity 110. On the other hand, the table 400 in FIG. 4 provides an exemplary visualization of local interpretation and, thus, relates to features 320 provided for a specific prediction by the student model.

Figure 5:
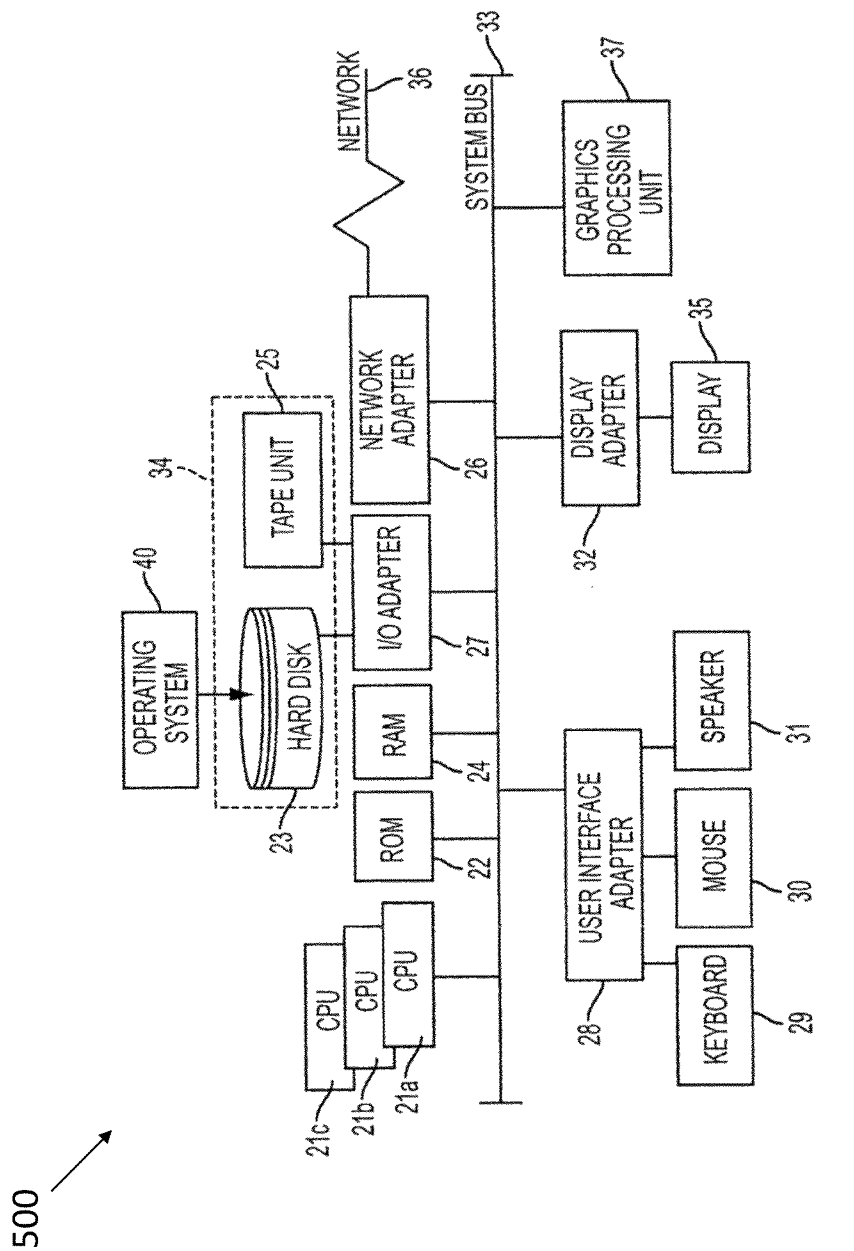
FIG. 5 is a block diagram of a processing system for implementing the search space exploration according to one or more embodiments of the invention.

It is understood that one or more embodiments of the present invention are capable of being implemented in conjunction with any other type of computing environment now known or later developed. For example, FIG. 5 depicts a block diagram of a processing system 500 for implementing the techniques described herein (e.g., processes of the method 200). In the embodiment shown in FIG. 5, processing system 500 has one or more central processing units (processors) 21*a*, 21*b*, 21*c*, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 500.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 500 can be stored in mass storage 34. The RAM 22, ROM 24, and mass storage 34 are examples of memory 19 of the processing system 500. A network adapter 26 interconnects system bus 33 with an outside network 36 enabling the processing system 500 to communicate with other such systems.

A display (e.g., a display monitor) 35 is connected to system bus 33 by display adapter 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 500 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 500 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 500.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

selecting, using a processor, an activity among a set of activities associated with a process as a selected activity, wherein prediction of an outcome of the selected activity is of interest;

designating, using the processor, one or more activities of the set of activities as classes, wherein a respective activity among the set of activities is designated as a class when that respective activity directly connects to the selected activity;

implementing the process one or more times, wherein implementing the process comprises encountering at least one activity among the set of activities, wherein encountering an activity comprises providing an input to the activity and receiving an output from the activity;

collecting, using the processor, a log of inputs and outputs of each encountered activity among the set of activities as a data point each time the process is implemented;

extracting, using the processor, features from each data point that is collected to generate a feature vector from each data point;

initializing, using the processor, a teacher model with a first data point that was collected;

updating, using the processor, first weights of the teacher model responsive to receiving each data point that was collected subsequent to the first data point, wherein the teacher model comprises a first model type comprising a variable number of parameters and the weights are updated with a single data point at a time;

initializing, using the processor, a student model with a set of data points including the first data point, the student model comprising a second model type, different than the first model type, that is initialized only after every designated class is encountered at least once, the student model further comprising a batch type model with a fixed number of parameters having second weights that are updated concurrently, per-batch, with a batch of new data points comprising two or more data points at a time;

overwriting, using the processor, the second weights of the student model with a subset of the first weights of the teacher model following a collection of each subsequent data point after the set of data points such that weights of the student model are updated using a per-data point update of the teacher model, thereby updating the student model using less training data than would be required for per-batch updating while preserving global interpretability and local interpretability, wherein the per-data point update comprises updating all weights of the student model with less than all of the weights of the teacher model;

inputting, to the processor, a set of features to the student model to obtain a prediction of the outcome of the selected activity based on determining that the student model is ready for use, wherein the student model is ready for use when a prediction accuracy of the student model exceeds a threshold accuracy value; and outputting, by the student model, a visual output for local interpretation explaining individual contributions of features and their respective weights to a decision recommendation for the set of features.

2. The computer-implemented method according to claim 1, wherein the designating the one or more activities as classes includes identifying all activities that interact directly with the selected activity.

3. The computer-implemented method according to claim 1 further comprising ensuring that the feature vector from each data point has a same length by padding the feature vector if needed.

4. The computer-implemented method according to claim 1, wherein the initializing the student model includes determining an initial weight associated with each of the features.

5. The computer-implemented method according to claim 1, wherein the updating the teacher model includes improving weight values associated with the teacher model based on each subsequent data point, and the updating the student model with the teacher model includes extracting the weight values that correspond with the features of the student model and improving the corresponding weight of each of the features of the student model with a corresponding one of the weight values from the teacher model.

6. The computer-implemented method according to claim 5 further comprising presenting an indication of the features and the corresponding weights used in the student model as a global interpretation of the student model.

7. The computer-implemented method according to claim 5 further comprising presenting the set of features that are input to the student model to obtain the prediction and the corresponding weights as a local interpretation of the student model.

8. A system comprising:

a memory having computer readable instructions; and one or more processors for executing the computer readable instructions, the computer readable instructions controlling the one or more processors to perform operations comprising:

selecting an activity among a set of activities associated with a process as a selected activity, wherein prediction of an outcome of the selected activity is of interest;

designating one or more activities of the set of activities as classes, wherein a respective activity among the set of activities is designated as a class when that respective activity directly connects to the selected activity;

implementing the process one or more times, wherein implementing the process comprises encountering at least one activity among the set of activities, wherein encountering an activity comprises providing an input to the activity and receiving an output from the activity;

collecting a log of inputs and outputs of each encountered activity among the set of activities as a data point each time the process is implemented;

extracting features from each data point that is collected to generate a feature vector from each data point;

initializing a teacher model with a first data point that was collected;

updating first weights of the teacher model responsive to receiving each data point that was collected subsequent to the first data point, wherein the teacher model comprises a first model type comprising a variable number of parameters and the weights are updated with a single data point at a time;

initializing a student model with a set of data points including the first data point, the student model comprising a second model type, different than the first model type, that is initialized only after every designated class is encountered at least once, the student model further comprising a batch type model with a fixed number of parameters having second weights that are updated concurrently, per-batch, with a batch of new data points comprising two or more data points at a time;

overwriting the second weights of the student model with a subset of the first weights of the teacher model following a collection of each subsequent data point after the set of data points such that weights of the student model are updated using a per-data point update of the teacher model, thereby updating the student model using less training data than would be required for per-batch updating while preserving global interpretability and local interpretability, wherein the per-data point update comprises updating all weights of the student model with less than all of the weights of the teacher model;

inputting a set of features to the student model to obtain a prediction of the outcome of the selected activity based on determining that the student model is ready for use, wherein the student model is ready for use when a prediction accuracy of the student model exceeds a threshold accuracy value; and outputting, by the student model, a visual output for local interpretation explaining individual contributions of features and their respective weights to a decision recommendation for the set of features.

9. The system according to claim 8, wherein the designating the one or more activities as classes includes identifying all activities that interact directly with the selected activity.

10. The system according to claim 8 further comprising ensuring that the feature vector from each data point has a same length by padding the feature vector if needed.

11. The system according to claim 8, wherein the initializing the student model includes determining an initial weight associated with each of the features, the updating the teacher model includes improving weight values associated with the teacher model based on each subsequent data point, and the updating the student model with the teacher model includes extracting the weight values that correspond with the features of the student model and improving the corresponding weight of each of the features of the student model with a corresponding one of the weight values from the teacher model.

12. The system according to claim 11 further comprising presenting an indication of the features and the corresponding weights used in the student model as a global interpretation of the student model.

13. The system according to claim 11 further comprising presenting the set of features that are input to the student model to obtain the prediction and the corresponding weights as a local interpretation of the student model.

14. A computer program product comprising a computer readable storage medium having program instructions embodied therewith, the program instructions executable by a processor to cause the processor to perform operations comprising:

selecting an activity among a set of activities associated with a process as a selected activity, wherein prediction of an outcome of the selected activity is of interest;

designating one or more activities of the set of activities as classes, wherein a respective activity among the set of activities is designated as a class when that respective activity directly connects to the selected activity;

implementing the process one or more times, wherein implementing the process comprises encountering at least one activity among the set of activities, wherein encountering an activity comprises providing an input to the activity and receiving an output from the activity;

collecting a log of inputs and outputs of each encountered activity among the set of activities as a data point each time the process is implemented;

extracting features from each data point that is collected to generate a feature vector from each data point;

initializing a teacher model with a first data point that was collected;

updating first weights of the teacher model responsive to receiving each data point that was collected subsequent to the first data point, wherein the teacher model comprises a first model type comprising a variable number of parameters and the weights are updated with a single data point at a time;

initializing a student model with a set of data points including the first data point, the student model comprising a second model type, different than the first model type, that is initialized only after every designated class is encountered at least once, the student model further comprising a batch type model with a fixed number of parameters having second weights that are updated concurrently, per-batch, with a batch of new data points comprising two or more data points at a time;

overwriting the second weights of the student model with a subset of the first weights of the teacher model following a collection of each subsequent data point after the set of data points such that weights of the student model are updated using a per-data point update of the teacher model, thereby updating the student model using less training data than would be required for per-batch updating while preserving global interpretability and local interpretability, wherein the per-data point update comprises updating all weights of the student model with less than all of the weights of the teacher model;

inputting a set of features to the student model to obtain a prediction of the outcome of the selected activity based on determining that the student model is ready for use, wherein the student model is ready for use when a prediction accuracy of the student model exceeds a threshold accuracy value; and outputting, by the student model, a visual output for local interpretation explaining individual contributions of features and their respective weights to a decision recommendation for the set of features.

15. The computer program product according to claim 14, wherein the designating the one or more activities as classes includes identifying all activities that interact directly with the selected activity.

16. The computer program product according to claim 14 further comprising ensuring that the feature vector from each data point has a same length by padding the feature vector if needed.

17. The computer program product according to claim 14, wherein the initializing the student model includes determining an initial weight associated with each of the features, the updating the teacher model includes improving weight values associated with the teacher model based on each subsequent data point, and the updating the student model with the teacher model includes extracting the weight values that correspond with the features of the student model and improving the corresponding weight of each of the features of the student model with a corresponding one of the weight values from the teacher model.

18. The computer program product according to claim 17 further comprising presenting an indication of the features and the corresponding weights used in the student model as a global interpretation of the student model, and presenting the set of features that are input to the student model to obtain the prediction and the corresponding weights as a local interpretation of the student model.

* * * * *